United States Patent
Legendre et al.

(10) Patent No.: US 10,462,509 B2
(45) Date of Patent: Oct. 29, 2019

(54) DELIVERY OF ELECTRONIC PROGRAMMING GUIDE USING A CACHING CONTENT DELIVERY NETWORK

(71) Applicant: BCE Inc., Verdun (CA)

(72) Inventors: Georges-Etienne Legendre, Stoneham (CA); Chris Snyder, Toronto (CA); Frederic Tardif, Quebec (CA); Simon Lavigne-Giroux, Quebec (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 15/850,950

(22) Filed: Dec. 21, 2017

(65) Prior Publication Data

US 2018/0192111 A1    Jul. 5, 2018

Related U.S. Application Data

(60) Provisional application No. 62/440,091, filed on Dec. 29, 2016.

(51) Int. Cl.
| | |
|---|---|
| *H04N 21/262* | (2011.01) |
| *H04N 21/231* | (2011.01) |
| *H04N 21/422* | (2011.01) |
| *H04N 21/462* | (2011.01) |
| *H04N 21/222* | (2011.01) |
| *H04N 21/239* | (2011.01) |
| *H04N 21/482* | (2011.01) |
| *H04N 21/6587* | (2011.01) |

(52) U.S. Cl.
CPC ..... *H04N 21/26283* (2013.01); *H04N 21/222* (2013.01); *H04N 21/2393* (2013.01); *H04N 21/23106* (2013.01); *H04N 21/23109* (2013.01); *H04N 21/42209* (2013.01); *H04N 21/462* (2013.01); *H04N 21/4821* (2013.01); *H04N 21/6587* (2013.01)

(58) Field of Classification Search
CPC ....... H04N 21/26283; H04N 21/23109; H04N 21/42209; H04N 21/462; H04N 21/222; H04N 21/23106; H04N 21/2393; H04N 21/4821; H04N 21/6587
See application file for complete search history.

(56) References Cited

U.S. PATENT DOCUMENTS

| | | | | |
|---|---|---|---|---|
| 2008/0127257 | A1* | 5/2008 | Kvache | H04H 20/57 725/39 |
| 2009/0253415 | A1* | 10/2009 | Walker | H04H 60/39 455/414.1 |
| 2014/0337888 | A1* | 11/2014 | Doan | H04N 21/4314 725/39 |

* cited by examiner

*Primary Examiner* — Nicholas T Corbo
(74) *Attorney, Agent, or Firm* — Gowling WLG (Canada) LLP

(57) ABSTRACT

An electronic programming guide (EPG) may be efficiently distributed through a CDN by breaking the EPG into elements including EPG info element that provides an indication of the current EPG version and a length of schedule blocks within the EPG. The EPG info can be retrieved periodically, and when a change of the EPG version is detected, EPG Channels info can be retrieved that provides a list of all channels in the EPG as well as an indication for each schedule block of the channel of the EPG version in which the schedule block was last changed. The schedule block version information may be used to retrieve the particular schedule block information when required, and if the correct version of the schedule block is not available at the device. The individual schedule block provides an indication of what programs are airing during the schedule block. Further details of each program may be retrieved as required for each program.

24 Claims, 6 Drawing Sheets

DELIVERY OF ELECTRONIC PROGRAMMING GUIDE USING A CACHING CONTENT DELIVERY NETWORK

RELATED APPLICATIONS

The current application claims priority to U.S. Provisional Patent Application 62/440,091 Filed Dec. 29, 2016, the entire contents of which are incorporated herein by reference.

TECHNICAL FIELD

The current application relates to delivering electronic programming guide (EPG) information to a computing device and in particular to delivering (EPG) using a caching content delivery network (CDN).

BACKGROUND

An electronic program guide (EPG) provides scheduling information for programs shown on different channels in a television network. For example, the EPG provides the specific programs, and possibly detailed information regarding the programs, that will appear on each channel throughout the day or days. As more people begin to consume scheduled programming on multiple devices, including devices that may have limited computing resources such as mobile phones, set-top boxes, smart televisions and other computing devices, distributing EPG information may be problematic. The EPG information may be relatively large, with details of all programs appearing on all channels for a period of time, such as two weeks. In order to limit the amount of EPG data that needs to be transmitted to and stored at the device, the EPG data may be downloaded in sections.

While downloading only portions of the EPG data may reduce the amount of data required to be transmitted at once, it may provide an undesirable user experience as it may still take a relatively long time to retrieve the EPG data. The EPG data may be periodically updated causing new EPG data to be downloaded.

It would be desirable to distribute EPG data to computing devices in a manner that provides an improved, or at least acceptable, user experience.

BRIEF DESCRIPTION OF THE DRAWINGS

Features, aspects and advantages of the present disclosure will become better understood with regard to the following description and accompanying drawings in which.

DETAILED DESCRIPTION

Figure 1:
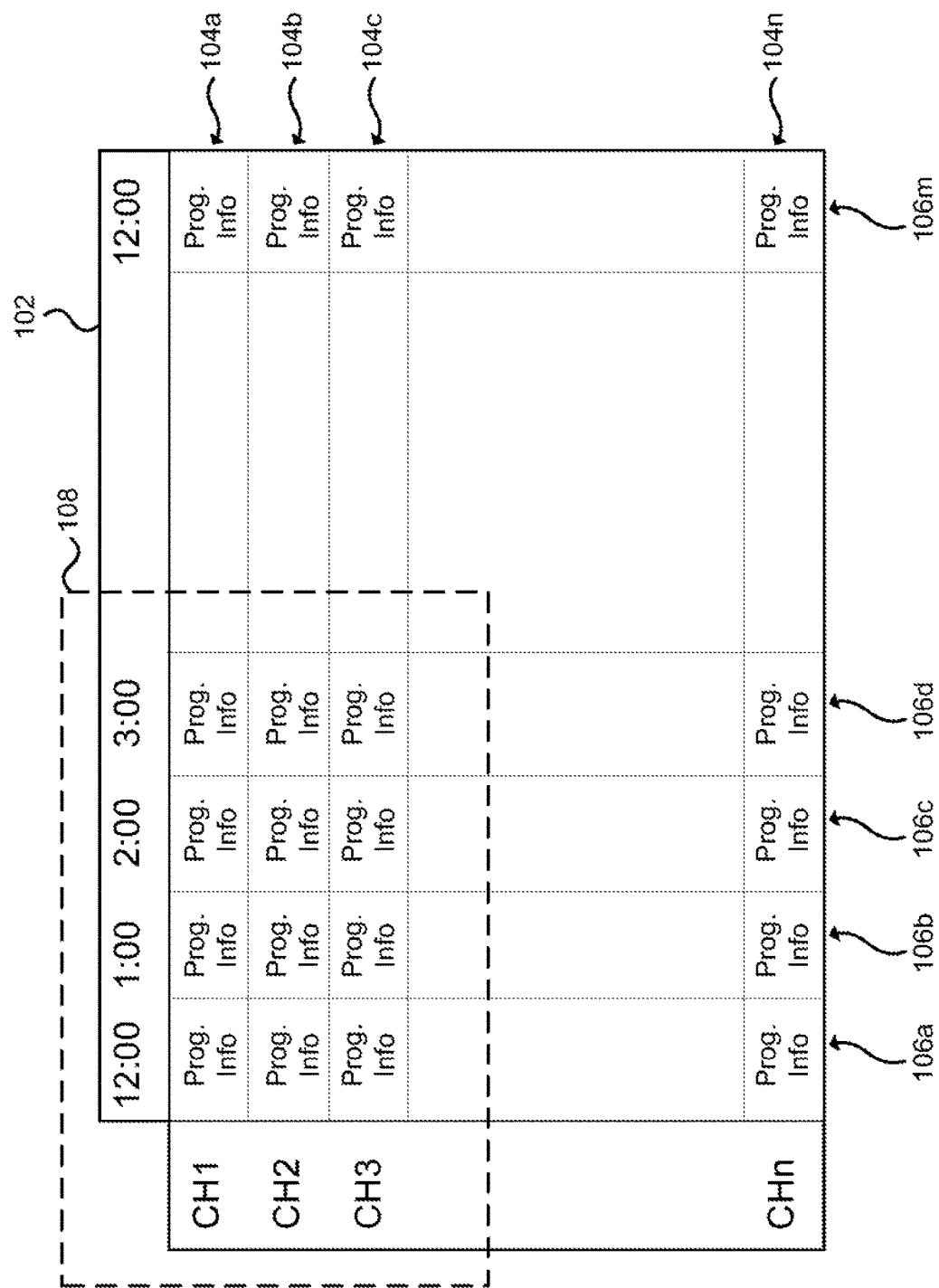
FIG. 1 depicts illustrative EPG information.

In accordance with the present disclosure there is provided a method of distributing electronic programming guide (EPG) information to a remote content consumption device through a content distribution network (CDN), the method comprising: at the content consumption device, receiving EPG information comprising an indication of a current version of the EPG; at the content consumption device, requesting and receiving channel schedule information for the current EPG version, the channel schedule information specifying a plurality of channel schedule block versions of a channel's schedule; and if a received channel schedule block version differs from a schedule block version of an existing channel schedule block available on the content consumption device, requesting and receiving an updated channel schedule block corresponding to the existing channel schedule block.

In a further embodiment of the method, the existing channel schedule block is visible in a portion of the EPG currently displayed.

In a further embodiment of the method, the existing channel schedule block is located in a portion of the EPG not currently being displayed.

In a further embodiment, the method further comprises determining that the current version of the EPG differs from an available EPG version available on the content consumption device, wherein, the channel schedule information is requested when the current EPG version differs from the available EPG version.

In a further embodiment, the method, further comprises determining if any of the received channel schedule block versions forming a respective channel's schedule differ from the existing channel schedule block versions forming the channel's schedule available on the content consumption device.

In a further embodiment of the method, each channel schedule block comprises one or more program identifiers (ID) specifying a program airing during the channel schedule block, the method further comprising: requesting and receiving program details associated with a respective program ID of the one or more program IDs of the channel schedule block.

The method of claim 6, wherein requesting program details comprises transmitting a program details request cacheable by the CDN.

In a further embodiment of the method, determining if the received channel schedule block version differs from the existing channel schedule block version is performed when: a portion of the schedule associated with a channel schedule block is to be displayed in the EPG; or a channel schedule block is to be cached.

In a further embodiment of the method, requesting the EPG information comprises transmitting a request cacheable by the CDN.

In a further embodiment of the method, requesting the channel schedule information comprises transmitting a channel schedule information request cacheable by the CDN.

In a further embodiment of the method, requesting the updated channel schedule block comprises transmitting an updated channel schedule block request cacheable by the CDN.

In a further embodiment of the method, each of the EPG information request, channel schedule information request and updated channel schedule block request comprise respective HTTP GET messages.

In accordance with the present disclosure there is further provided a content consumption device comprising: a display for displaying programming content; a memory for storing instructions; and a processing device for executing the instructions, which when executed configure the content consumption device to perform a method for distributing electronic programming guide (EPG) information through a content distribution network (CDN) by: receiving EPG information comprising an indication of a current version of the EPG; requesting and receiving channel schedule information for the current EPG version, the channel schedule information specifying a plurality of channel schedule block versions of a channel's schedule; and if a received channel schedule block version differs from a schedule block version of an existing channel schedule block available on the content consumption device, requesting and receiving an updated channel schedule block corresponding to the existing channel schedule block.

In a further embodiment of the content consumption device, the existing channel schedule block is visible in a portion of the EPG currently displayed.

In a further embodiment of the content consumption device, the existing channel schedule block is located in a portion of the EPG not currently being displayed.

In a further embodiment of the content consumption device, the instructions stored in the memory further configure the device to: determine that the current version of the EPG differs from an available EPG version available on the content consumption device, wherein, the channel schedule information is requested when the current EPG version differs from the available EPG version.

In a further embodiment of the content consumption device, the instructions stored in the memory further configure the device to further: determine if any of the received channel schedule block versions forming a respective channel's schedule differ from the existing channel schedule block versions forming the channel's schedule available on the content consumption device.

In a further embodiment of the content consumption device, each channel schedule block comprises one or more program identifiers (ID) specifying a program airing during the channel schedule block, wherein the instructions stored in the memory further configure the device to further: request and receive program details associated with a respective program ID of the one or more program IDs of the channel schedule block.

In a further embodiment of the content consumption device, requesting program details comprises transmitting a program details request cacheable by the CDN.

In a further embodiment of the content consumption device, it is determined if a received channel schedule block version differs from an existing channel schedule block when: a portion of the schedule associated with a channel schedule block is to be displayed in the EPG; or a channel schedule block is to be cached.

In a further embodiment of the content consumption device, requesting the EPG information comprises transmitting a request cacheable by the CDN.

In a further embodiment of the content consumption device, wherein requesting the channel schedule information comprises transmitting a channel schedule information request cacheable by the CDN.

In a further embodiment of the content consumption device, requesting the updated channel schedule block comprises transmitting an updated channel schedule block request cacheable by the CDN.

In a further embodiment of the content consumption device, each of the EPG information request, channel schedule information request and updated channel schedule block request comprise respective HTTP GET messages.

An efficient way of delivering electronic programming guide (EPG) information to devices is described that allows individual elements of the EPG to be delivered using the HTTP protocol. As described further below, the EPG elements distributed using HTTP can be distributed through, and cached by, a content delivery network (CDN), which allows the EPG elements to be quickly distributed to numerous devices. Further, the technique for distributing the EPG information described further below allows the EPG information to be updated and devices to retrieve only the EPG elements that have updated information when required.

FIG. 1 depicts illustrative EPG information. The EPG information 102 comprises the programming information for available channels for a period of time, such as a number of hours, days, or weeks. Each of the available channels has channel information 104a-104n for each channel in the EPG. Each of the channels in the EPG has programming information at particular times 106a-106m in the programming schedule. The EPG information 102 depicts programs as starting every hour and lasting an hour; however, it is possible for individual programs to start at any particular time and last for any amount of time. The start times and stop times of programs on different channels do not need to be aligned with each other or with time increments, such as every hour, half hour, quarter hour etc. While the EPG information provides all of the programming information for all channels over the length of the EPG, it is possible for only a portion of the EPG to be displayed, such as the portion depicted by broken rectangle 108.

The entirety of the EPG information 102 may be stored at the device, or it may be retrieved as required. However, the complete EPG information 102 may be a relatively large amount of information to deliver, and possibly store, to mobile devices or devices with limited computing resources. If sent as a monolithic block, not all devices may be able to store the EPG information in memory, and could result in a poor user experience. Further, the EPG information would need to be downloaded to the device each time an update to the EPG information is made. Further, in the case of mobile devices, the application that displays the EPG information may only be active if the user has opened the application and as such, downloading or updating EPG information in the background, or when the application is not running, may not be possible.

As described further below, updated EPG information may be distributed to mobile devices, or other devices, by breaking the EPG information into different elements that can be downloaded individually as required. While previous EPGs have retrieved only portions of EPG information at a time, for example retrieving only the portion of an EPG that is visible or may be visible shortly, such techniques may be difficult to cache the results in a CDN and may also make maintaining updated information difficult.

As described further herein, the EPG information is broken into a number of EPG elements that together provide the EPG information. In particular, an EPG info table provides minimum details of the current EPG including a current version of the EPG. As the EPG information is updated, the version numbering is updated as well. The EPG info table provides a relatively small element that can be retrieved frequently in order to determine the latest version of the EPG and so, whether other information needs to be updated. When the EPG version has been updated, the EPG channels info table may be retrieved that provides information on the full list of channels available. The schedule of each channel is formed as a number of schedule blocks, each of which are of a particular set length, for example 4 hours. Schedule blocks of different channels may be aligned across the channels. In addition to the full channel list, the EPG channels info table further includes an indication of the EPG version that the respective schedule block was last changed.

The EPG elements may also include EPG Channel Schedule Blocks that provide information on the particular programs that occur at the particular schedule block. The programming information in the schedule blocks do not need to start and stop within the schedule block. That is, an individual program may span multiple schedule blocks of a channel. Individual program information, such as detailed information including synopsis, actor information etc., of individual programs may be retrieved as required. As described further below, the EPG info provides an indication of whether the EPG information has been updated. EPG channels info provides an indication of what portions of the different channels have been updated, or what version of the EPG the different portions were updated. The EPG channel schedule block provides information on particular programs occurring during the particular schedule block. Program information may be retrieved for any program in the schedule block. By breaking the EPG information into the EPG elements as described, it is possible to distribute the EPG information to devices in a fast and efficient manner, even as the EPG information is periodically updated.

Figure 2:
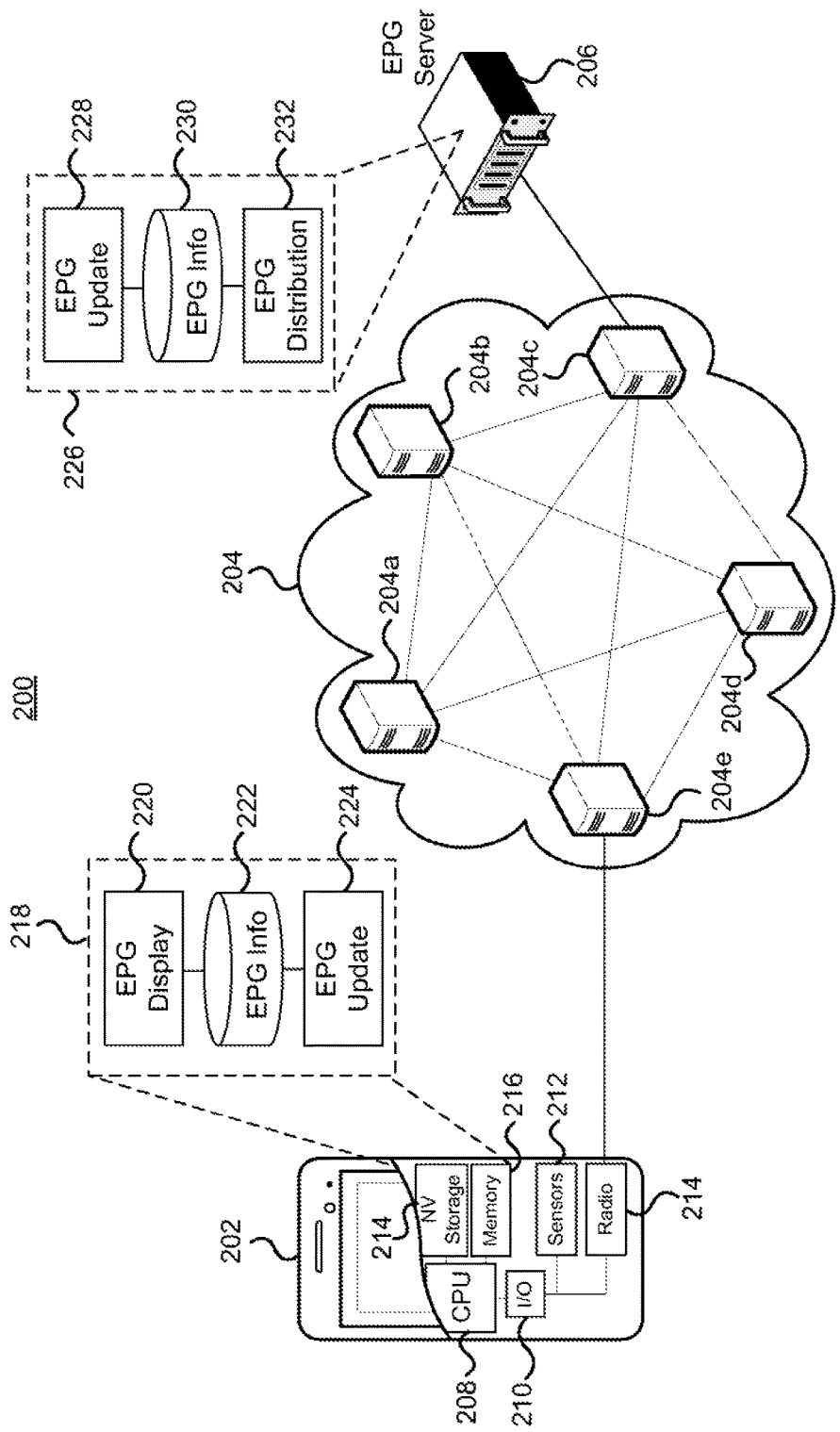
FIG. 2 depicts a system for distributing EPG information.

FIG. 2 depicts a system for distributing EPG information. The system 200 comprises a mobile device 202 that displays EPG information. Although a mobile device such as a smartphone is depicted, other computing devices may retrieve and display the EPG information according to the same process described further herein. The mobile device 202 may be connected to a content delivery network 204, which may form part of a larger network such as the Internet. The content delivery network provides a number of edge servers 204a-e that act as front ends to an EPG server 206. The edge server 204a-e may cache requests at the edge of networks so that requests may be responded to more quickly. As described in more detail below, the mobile device 202 retrieves EPG data from the EPG server 206 through the CDN 204. The CDN allows the requested EPG data to be cached near the edges of the CDN and so be delivered to other devices quickly.

The mobile device 202 comprises a central processing unit 208 for executing instructions that configure the mobile device to provide various functionality. The mobile device 202 may further comprise one or more input/output (I/O) interfaces 210 for connecting other components capable of inputting data to and/or outputting data from the mobile device 202. The I/O devices may include numerous different components including touch screens, keyboards, microphones, speakers, etc. The I/O devices may include sensors 212 as well as radios 214 that allow wireless communication with other devices, including connections to the CDN 204. As depicted, the mobile device 202 may include various storage components including non-volatile (NV) storage 214 and memory 216, which may be for example random access memory (RAM). The memory 216 may store instructions for execution by the processor 208 to configure the mobile device to provide various functionality including EPG functionality 218. The EPG functionality 218 includes functionality for EPG display functionality 220 for displaying locally accessible EPG information 222 as well as EPG Update functionality 224 for updating the EPG information as required.

The EPG information 222 available at the mobile device is retrieved by the EPG update functionality 224 from the CDN 204, which may retrieve requested EPG info from the EPG server 206 if the information is not available at the edge servers 204a-e of the CDN 204. Although not depicted in FIG. 2 the EPG server comprises at least a processing unit for executing instructions and a memory unit for storing the instructions, which when executed, configure the EPG server to provide various functionality. Although depicted as a single EPG server 206, it will be appreciated that the EPG server may be provided by a plurality of individual servers.

The EPG server may be configured to provide EPG functionality 226 that includes EPG update functionality 228 that allows for the EPG information 230 to be updated, for example to change a program airing on a particular channel at a particular time. The EPG information 230 may store both current and previous versions of EPG data. The EPG functionality 226 may further include EPG distribution functionality 232 that distributes the EPG elements to mobile devices, through the CDN 204, as described further below. In particular, the EPG distribution functionality 232 may respond to requests for EPG elements, such as the EPG info, EPG Channels info, EPG Channel Schedule block info and program info. The response provided from the EPG server may be cached by the CDN in order to respond to subsequent requests for the same data more quickly.

Figure 3:
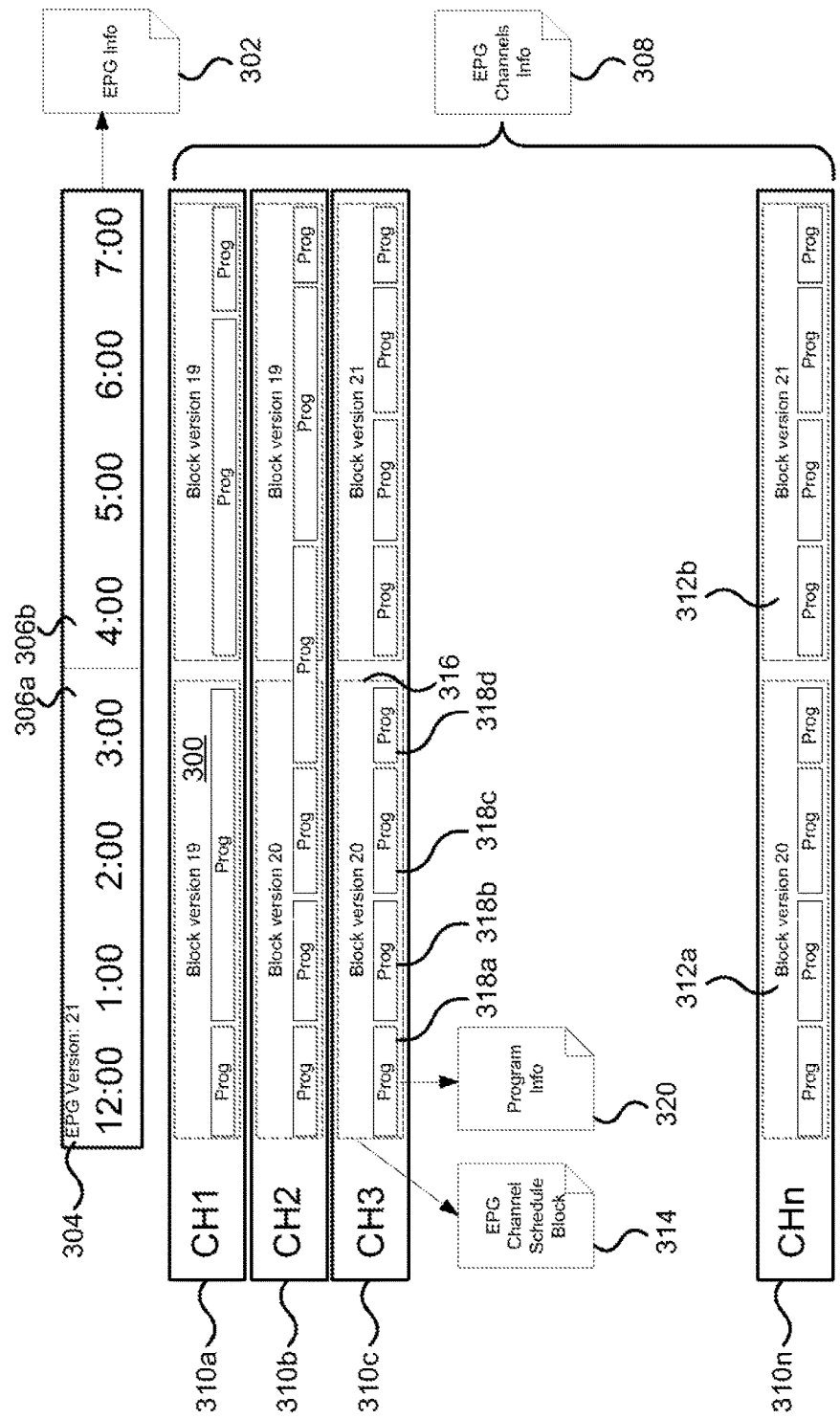
FIG. 3 depicts EPG elements distributed in the system of FIG. 2.

FIG. 3 depicts EPG elements distributed in the system of FIG. 2. The EPG, which may be viewed as a table of programs airing on particular channels at particular times, may be broken into an EPG info file 302 that contains information about the current version 304 of the EPG. Each time the EPG information is updated at the EPG server, the EPG version is changed. Although various numbers/characters may be used for the EPG version 304, it is depicted simply as an increasing integer. The EPG info 302 also includes an indication of the length of schedule blocks 306. FIG. 3 depicts two schedule blocks of 4 hours each. In an EPG, all schedule blocks are of the same length, with the particular length specified in the EPG info 302. The EPG info is a relatively small file and as such can be quickly retrieved periodically from the mobile device without greatly increasing data usage. For example, the EPG info 302 may be requested by the mobile device every 10 minutes. In addition to providing information on the length of time of schedule blocks, the EPG info also provides an indication of the current EPG version 302, which allows the mobile device to determine when the EPG has been updated.

The EPG is further broken into EPG Channels info 308 that provides a list of all of the channels 310a-n in the EPG. Each channel listing in the EPG Channels info 308 may include basic channel information such as a channel identifier, number, display name etc. Further, for each channel, the EPG Channels info 308 includes information for each schedule block of the channel indicating the EPG version in which the schedule block was last changed. The EPG depicted in FIG. 3 depicts an EPG that is 8 hours long, however, typically an EPG will be longer, such as a day, a few days, a week, two weeks or more. For longer lengths of EPGs, each of the channels will have more schedule blocks. For example, if the EPG were 1 day long, and each schedule block was 4 hours long, each channel in the EPG would have 6 different schedule blocks. As numbered for channel CHn 310n, a first schedule block 312a may have a block version of 20 indicating that the first schedule block was last updated in EPG version 20. Similarly, the second schedule block 312b has a block version of 21 indicating that the second schedule block was updated after the first schedule block in the EPG version 21.

When displaying EPG information, the device may display the programming information associated with one or more schedule blocks for one or more channels. The device may determine what schedule blocks are being displayed and may determine if the correct schedule block version for the displayed blocks are available at the device. If the correct block versions are not available, the EPG channel schedule block 314 for the particular time, channel and version is retrieved. The schedule blocks, for example schedule block 316 of CH3 310c, describes the programs 318a-d that air on the associated channel during the time, including the start and end times of the programs as well as a program identifier that indicates the particular program being aired. Although the programs depicted in the first schedule block 316 of channel CH3 310c are all depicted as starting and stopping within the schedule block, the programs do not need to start and/or stop within the time of the schedule block. If the correct block version is available at the mobile device, it does not need to be retrieved in order to display the correct information. If detailed program info 320 of a program is desired to be displayed, it can be retrieved on an individual program basis using, for example the program identifier indicated in the EPG Channel schedule block 314.

Figure 4:
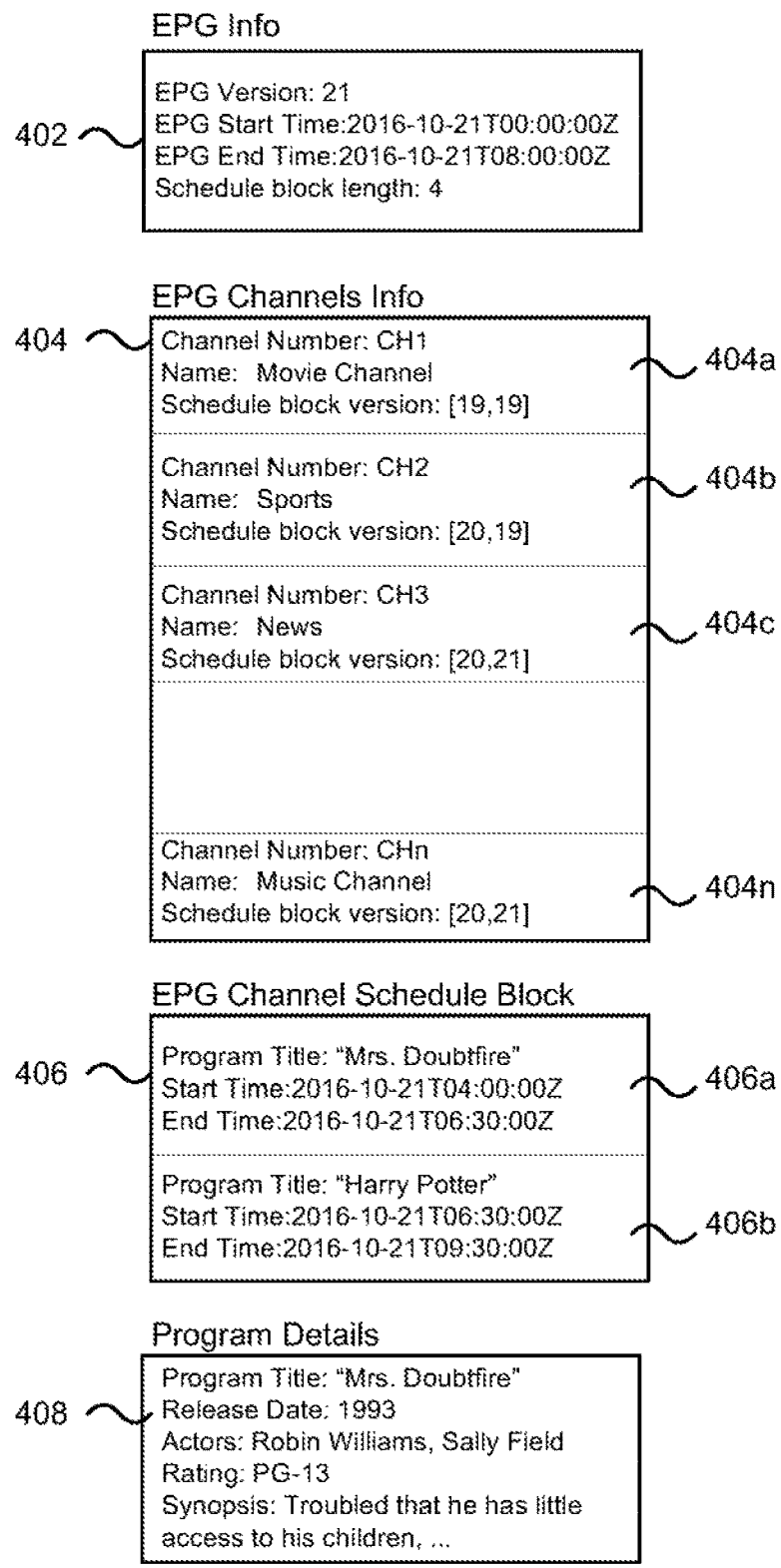
FIG. 4 depicts details of the EPG elements.

FIG. 4 depicts details of EPG elements of the EPG of FIG. 3. As depicted, the EPG info 402 includes an indication of the current EPG version, a start time of the EPG and an end time of the EPG. It is noted that the length of the EPG may be greater than that depicted, and could be for example 14 days. The EPG info 402 further includes an indication for the length of the schedule blocks. FIG. 4 depicts the schedule block length indication being provided as 4 hours, although different schedule block lengths may be used.

The EPG channels info 404 comprises a list of every channel 404a-n in the EPG. For each channel, the EPG channels info 404 may include an indication of the channel, which may include for example, the channel number and possibly a name for the channel. Additionally, for each channel, there is provided the schedule block versions of the channel. As depicted, each channel provides an indication of the schedule block version of the channel starting with the first schedule block of the channel for the EPG.

The EPG Channel Schedule Block 406, includes programming information 406a, 406b of each program airing during the schedule block. As depicted the programming information may include program information that identifies the program which could include a unique program identifier and/or program name as well as the start and end times of the program, which need not fall within a single schedule block. The correct schedule block provides information on the programs aired during that block time. Further program details 408 of the program may be retrieved, which may provide further details such as release dates, actors, rating, synopsis, art work, other air times, etc.

Figure 5:
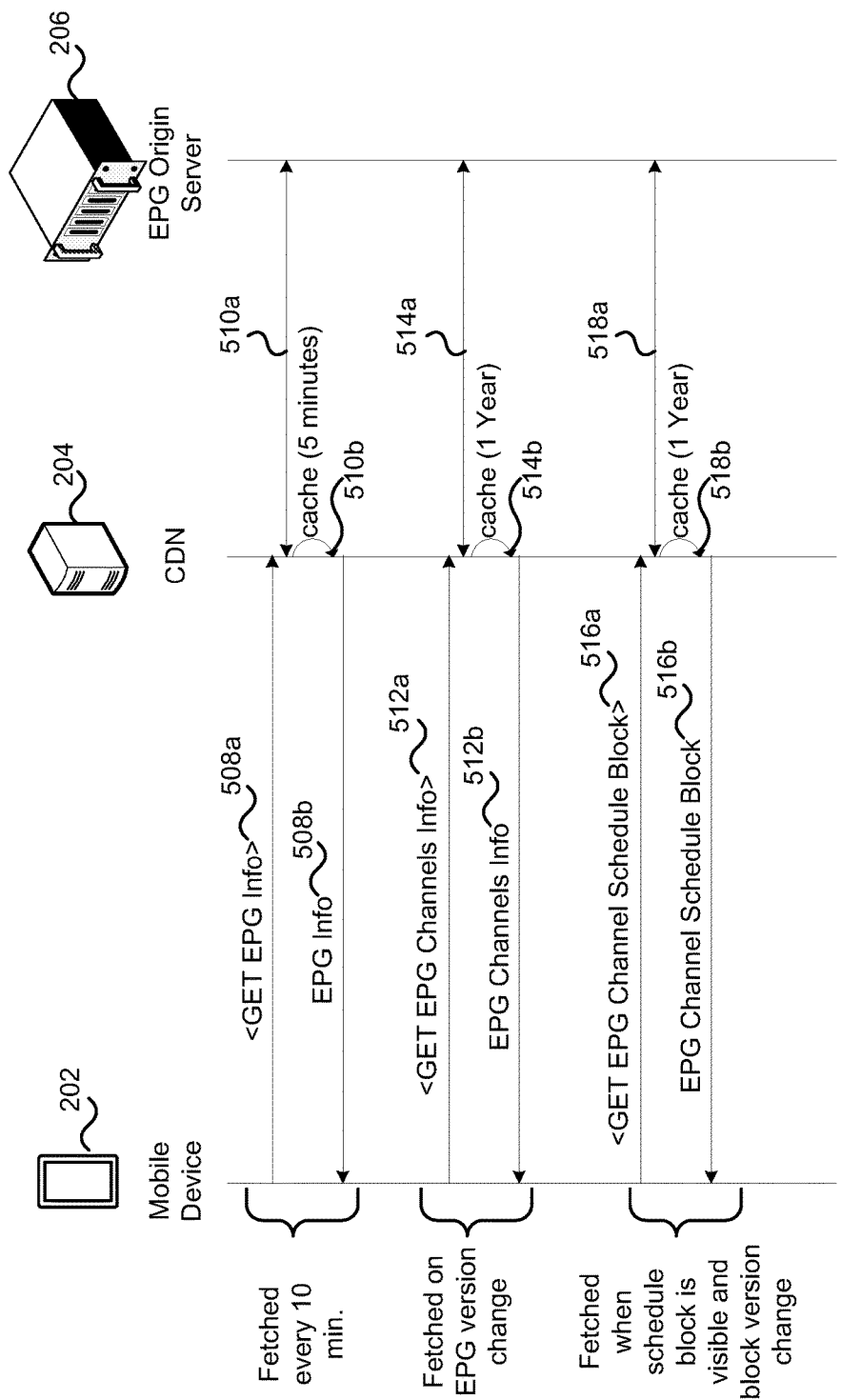
FIG. 5 depicts a message flow for distributing EPG information.

FIG. 5 depicts a message flow for distributing EPG information. As depicted a mobile device 202 may retrieve EPG information from a CDN 204, which in turn may retrieve the requested information from an EPG origin server 206 if the CDN does not have the requested data. The mobile device 202 may use HTTP GET requests for requesting the particular information, which allows the caching of the response to be easily implemented in the CDN 204. As depicted, the mobile device sends a GET request 508a periodically, such as every 10 minutes although other times are possible, to retrieve the EPG info from the CDN. If the requested information is available at the CDN, the EPG info is returned 508b to the mobile device. If the data is not available the CDN can retrieve the requested data 510a from the EPG origin server and cache the response 510b in order to respond to other devices when a subsequent request is received. As the EPG information is likely to be updated periodically, the cache may be set to expire relatively quickly, for example every 5 minutes, so that new EPG info is retrieved from the EPG origin server. When the mobile device receives the EPG info, the EPG Channels Info may be requested using a GET request 512a if the current EPG version indicated in the retrieved EPG Info differs from the last EPG version available at the device. If the current version indicated in the retrieved EPG Info matches the latest EPG version available at the device, no additional requests are required. The CDN receives the GET request and if the EPG Channels info is not available at the CDN, it can be retrieved 514a from the origin server and the response cached 514b. Since the EPG Channels Info includes version information, the response for a specific request will not change over time, and as such the CDN may cache the response for a long period of time, such as 1 year. The EPG Channels Info is returned 512b to the mobile device. When particular schedule blocks or portions of schedule blocks for one or more channels are to be displayed, the mobile device may compare the block version of the schedule blocks specified in the EPG Channels Info to the block version of the schedule block available at the mobile device. If the current block version differs from the block version available at the device, the mobile device may request the EPG Channel Schedule Block using a GET request 516a. Again the CDN may retrieve the requested data 518a from the origin server and cache it 518b if the data is not already available. The EPG Channel Schedule Block data may be cached for long periods of time, such as 1 year. The EPG Schedule Block information is returned 516b to the mobile device and the mobile device may display the program information as desired.

Figure 6:
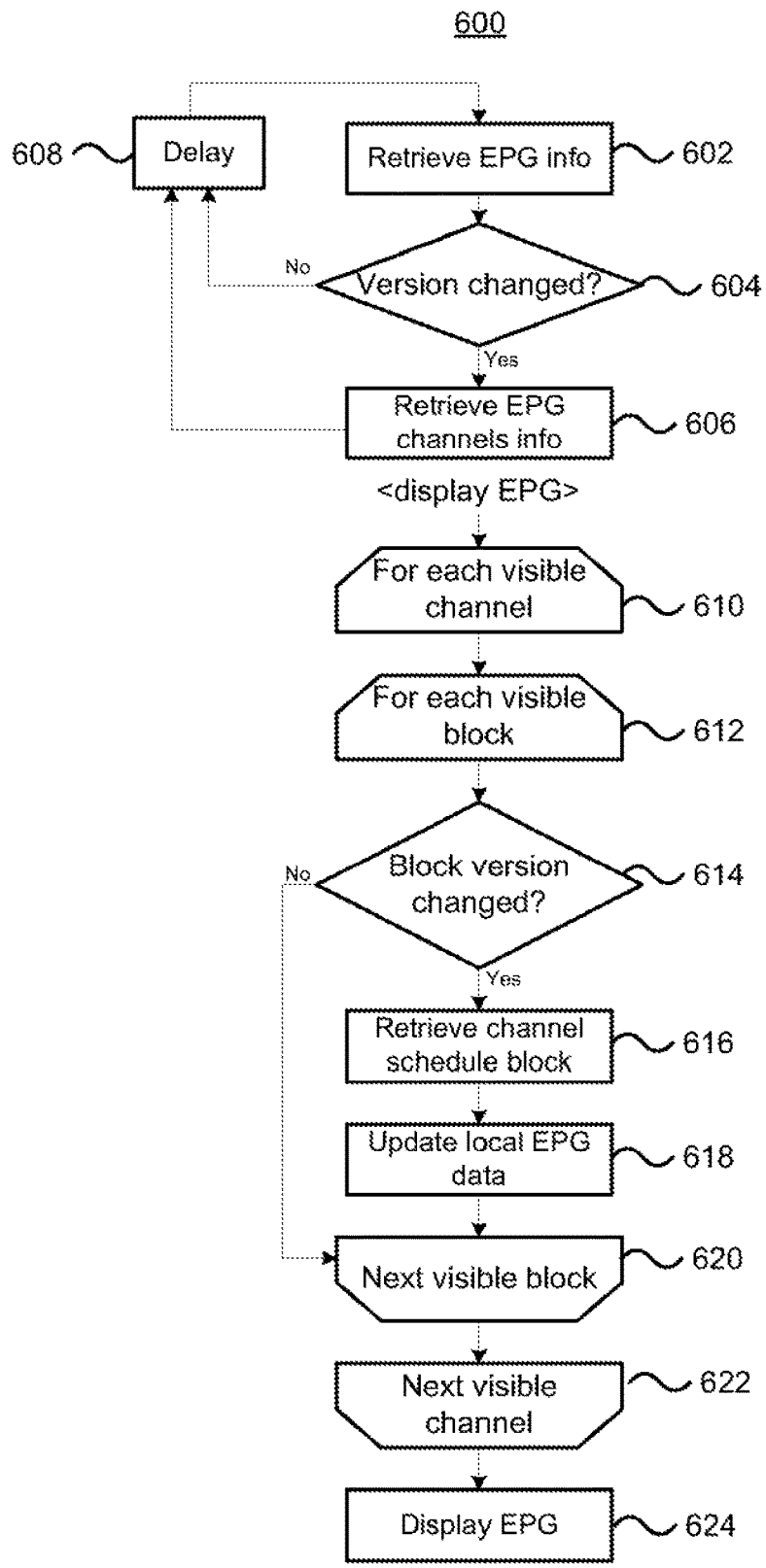
FIG. 6 depicts a method of distributing EPG information.

FIG. 6 depicts a method of distributing EPG information. The method 600 may be implemented by the EPG functionality of a mobile device. The method 600 receives EPG info (602), which includes an indication of the current EPG version as well as an indication of a length of EPG schedule blocks. The EPG info may be received as a result of a specific request from the client, such as an HTTP GET request for example, or may be pushed to the client periodically or when the EPG info has been updated. The EPG info may further include start and stop dates and times of the EPG. When the EPG info is received and the client, it is determined if the EPG version has changed (604) from the version available at the mobile device. If the EPG version has changed (Yes at 604), the EPG Channels info may be retrieved (606) using an HTTP GET request. The EPG Channels Info may include a list of the channels as well as a version identifier for each schedule block of the channel's schedule indicating when the respective schedule block was last updated. The channel schedule block version may be a unique identifier generated when the channel schedule block is updated. Once the EPG Channels info has been retrieved, or if the EPG version has not changed (No at 604), a delay (608) is performed, for example for 10 minutes and then the EPG info is again requested (602).

When EPG information is to be displayed, the method 600 determines what channels are visible, and for each visible channel (610) determines what schedule blocks are visible in the displayed portion of the EPG. For each visible schedule block (612), the method determines if the block version has changed (614). A schedule block version is considered to have changed if the schedule block version specified in the EPG channels info of the latest EPG version differs from the version of the corresponding schedule block available at the device. If the block version has changed (Yes at 614), the particular version of the channel schedule block is retrieved (616) and used to update the local EPG data (618) available at the mobile device. Once the updated channel schedule block has been retrieved, or if the block version has not changed (No at 614), the next visible block is retrieved and processed (620) as described above. Once the visible blocks of a channel is completed, the next channel is retrieved (622) and processed until all visible channels and their visible blocks have been processed. Once the processing of the visible channels and blocks is completed, all of the EPG information that is to be displayed will be the correct updated versions and can be displayed (624) as desired. The EPG data can be displayed in a large number of ways depending upon the particular interface.

The EPG distribution technique described above breaks the monolithic EPG data into particular EPG elements that enable the efficient distribution of the EPG data to mobile devices. The distribution techniques described above allow mobile devices to quickly retrieve portions of EPG data and as such, the mobile devices do not need to store large portions of the EPG at once in order to provide a desirable user experience. Rather, the EPG information can quickly be retrieved from a caching CDN when required.

Although various implementations are possible, one particular example of HTTP GET requests and associated responses are depicted below. It will be appreciated that the detailed API described below is only an example and a number of other implementations are possible.

The EPG info table may be requested by sending an HTTP GET request to /api/epg/v3/epgInfo. It will be appreciated that the request may be directed to other locations. As described above, the request will return basic EPG information including, for example, the schedule version, the start and end times of the schedule as well a length of the individual schedule blocks.

Example request for getting EPG info:
GET /api/epg/v3/epgInfo HTTP/1.1
Host: tv.bell.ca
Accept: application/json
Example response returning EPG info:

```
HTTP/1.1 200 OK
Cache-Control: public, max-age=600
Content-Length: 12345
Content-Type: application/json; charset=utf-8
Date: Mon, 18 Feb 2013 12:00:00 GMT
{
    "version": "1234",
    "minStartTime": "2013-04-12T04:00:00Z",
    "maxEndTime": "2013-04-28T04:00:00Z",
    "schedulesBlockHoursDuration": 4
}
```

Once the basic EPG information has been received, the channel information can be requested by sending a GET request to /api/epg/v3/channels. The request may include details such as the particular tv service the schedule is being requested for, the particular channel map being requested and the EPG version being requested. The response provides information for each channel in the particular channel map including the version numbers of the different channel schedule blocks for the channel's schedule.

Request for channel schedule block information:
/api/epg/v3/channels
Request parameters:
tvServices: Specifies the TV services such as IPTV, SatelliteTV, MobileTV, OttTV
epgChannelMap: Specifies the EPG channel map to provide the information for such as the channel map for a particular geographic location
epgVersion: Specifies the EPG version for the schedule being requested
Example Request for Channel schedule block Information:
GET /api/epg/v3/channels? tvServices=IPTV &epgChannelMap=MAP_TORONTO&epgVersion=1234 HTTP/1.1
Host: tv.bell.ca
Accept: application/json
Example response returning channel schedule block information:

```
HTTP/1.1 200 OK
Cache-Control: public, max-age=31536000
Content-Length: 12345
Content-Type: application/json; charset=utf-8
Date: Mon, 18 Feb 2013 12:00:00 GMT
[
    {
        "numbers": [323,324],
        "callSign": "M-HD",
        "type": "Live", // Live, PPV (Pay-per-view) or VodPlaylist
        "name": The Movie Network",
        "contentProvider": "Bell Media",
        "providerId": "TMNCA",
        "subProviderId": "TMNCA2",
        "languages:" [ //Array containing languages// "en"],
        "format": "HD", // APP, Audio, HD, PVR, SD, SVOD, VOD
        "pairedChannelId": "M",
        "genres": ["Entertainment", "Family"],
        "premium": false,
        "availabilities": {
            "tv": true,
            "tv-recordable": true,
            "tv-trickplay-startover": true,
            "tv-trickplay-lookback": true,
            "nscreen-in-home-wifi": true,
            "nscreen-out-of-home-wifi": true,
            "nscreen-mobile": false
        },
        "schedulesBlockVersions": [23,23,23,23,23,23,24,23,23],
        "artworks": [
            {
                "type": "channellogo",
                "width": 780,
                "height": 490,
                "url": "channellogos/CTV-HD/{resolution}.png"
            },
            {
                "type": "channellogo-monochrome",
                "width": 728,
                "height": 420,
                "url": "channellogo-monochrome/{resolution}.png"
            }
        ]
    }
]
```

After receiving the block information, in particular the block version of the different schedule blocks forming the channel's schedule for the particular EPG version, for the various channels, specific channel programming can be requested for the individual blocks.

Request for block schedules:
/api/epg/v3/byBlockVersion/schedules
Request parameters:
tvService: specifies the TV services
epgChannelMap: specifies the EPG channel map
callSign: specifies the channel call sign
startTime: specifies the start time in ISO-8601 format
endTime: specifies the end time in ISO-8601 format
blockVersion: specifies the schedule block version
Example block information request:
GET /api/epg/v3/byBlockVersion/ schedules?tvServices=fibe&epgC hannelMap=MAP_TORONTO&callSign=CAN-
M&startTime=2013-04-12T00:00:
00.000Z&endTime=2013-04-12T04:00:
00.000Z&blockVersion=23 HTTP/1.1
Host: tv.bell.ca
Accept: application/json
X-BellCompanion-API-Key:     42d3b682-677a-4997-
    bbe9-66cff313ddb5
Example block information response:

```
HTTP/1.1 200 OK
Cache-Control: public, max-age=31536000
Content-Length: 12345
Content-Type: application/json; charset=utf-8
Date: Mon, 18 Feb 2013 12:00:00 GMT
[
    {
        "startTime": "2013-04-12T09:05:00Z",
        "endTime": "2013-04-12T11:00:00Z",
        "rating": "BCTV-G",
        "new": true,
        "showType": "SERIES",
        "availabilities": { // Overrides the availability
            "tv" : true,
            "tv-trickplay-startover" : false,
            "tv-trickplay-lookback" : false,
            "nscreen-in-home-wifi" : false,
            "nscreen-out-of-home-wifi" : false,
            "nscreen-mobile" : false
        },
        "programId": "ID_3886",
        "duration": 6900,
        "hd": false,
        "title": "Albert Nobbs",
        "episodeTitle": "Albert Nobbs",
        "closedCaption": true,
        "descriptiveVideo": true, // contains audio track
        "seriesId": "ID_2134
    },
    {
        "startTime": "2013-04-12T11:00:00Z",
        "endTime": "2013-04-12T12:35:00Z",
        "rating": "BCTV-BLANK",
        "new": false,
        "showType": "MOVIE",
        "availabilities": { // Overrides the availability
            "tv" : true,
            "tv-trickplay-startover" : false,
            "tv-trickplay-lookback" : false,
            "nscreen-in-home-wifi" : false,
            "nscreen-out-of-home-wifi" : false,
            "nscreen-mobile" : false
        },
        "programId": "ID_43265",
        "duration": 5700,
        "hd": false,
        "title": "Nicostratos le pélican",
        "episodeTitle": "Nicostratos le pélican",
        "closedCaption": true,
        "descriptiveVideo": true, // contains audio track
        "seriesId": null
    },
    ...
]
```

Alternative request when nothing is found:
HTTP/1.1 200 OK
Cache-Control: public, max-age=600
Content-Length: 12345
Content-Type: application/json; charset=utf-8
Date: Mon, 18 Feb. 2013 12:00:00 GMT
[ ]
Program detail request:
/api/epg/v3/programs/{programId}
Request Parameters:
programId: specifies a program ID of a particular program
    for which details are being requested Example request for program details:
GET /api/epg/v3/programs/7412 HTTP/1.1
Host: tv.bell.ca
Accept: application/json
Example response returning program details:

```
HTTP/1.1 200 OK
Cache-Control: public, max-age=600
Content-Length: 12345
Content-Type: application/json; charset=utf-8
Date: Mon, 18 Feb 2013 12:00:00 GMT
{
    "programId": "ID_79380",
    "showType": "MOVIE",
    "title": "Game of Thrones",
    "description": "Seven noble families fight for power",
    "seriesId": "ID_4063", // Empty when not a series
    "seasonId": "ID_131151", // Empty when not a series
    "episodeId": "46", // Empty when not a series.
    "episodeNumber": 3, // 0 when not a series
    "episodeTitle": "The Bear and the Maiden",
    "categories": [
        {
            "category": "Kids",
            "subcategory": "All"
        },
        {
            "category": "Movies",
            "subcategory": "Comedy"
        }
    ],
    "rating": "BCTV-G",
    "closedCaption": true,
    "advisories": ["ADULT_CONTENT", "BRIEFNUDITY", ...],
    "productionYear": 2012,
    "originalAirDate": "2012-05-13",
    "artworks": [ // Contains all artwork types and formats
        {
            "type": "series-banner",
            "ratio": "16:9",
            "width": 1600,
            "height": 900,
            "url": "programs/series/4063/12315/{res}.jpg"
        },
        {
            "type": "series-banner",
            "ratio": "4:3",
            "width": 400,
            "height": 300,
            "url": "programs/series/4063/12316/{res}.jpg"
        },
        {
            "type": "season-banner",
            "ratio": "4:3",
            "width": 400,
            "height": 300,
            "url": "programs/seasons/131151/12317/{res}.jpg"
        },
        {
            "type": "episode-preview",
            "ratio": "4:3",
            "width": 400,
            "height": 300,
            "url": "programs/episodes/79380/12318/{res}.jpg"
        }
    ]
    "castAndCrew": [
        {
            "id": "ID_1234510",
            "characterName": "Daenerys Targaryen",
            "name": "Emilia Clarke",
            "role": "Actor",
            "artworks": [ // Contains all artwork types
                {
                    "type": "celebrity-headshot",
                    "ratio": "16:9",
                    "width": 1600,
                    "height": 900,
                    "url": "celebrities/1234510/12319/{res}.jpg"
                },
```

-continued

```
{
    "type": "celebrity-headshot",
    "ratio": "4:3",
    "width": 800,
    "height": 600,
    "url": "celebrities/1234510/12320/{res}.jpg"
    }
},
{
    "characterName": "Queen Cersei Lannister",
    "name": "Lena Headey",
    "role": "Actor",
    "artworks": [ ]
},
{
    "id": "ID_1234512",
    "characterName": "Grand Maester Pycelle",
    "name": "Julian Glover",
    "role": "Actor",
    "artworks": [ ]
},
{
    "id": "ID_1234513",
    "characterName": "Ser Jorah Mormont",
    "name": "Iain Glen",
    "role": "Actor",
    "artworks": [ ]
},
{
    "id": "ID_1234514",
    "characterName": "Tyrion Lannister",
    "name": "Peter Dinklage",
    "role": "Actor",
    "artworks": [ ]
},
{
    "id": "ID_1234515",
    "characterName": "Eddard (Ned) Stark",
    "name": "Sean Bean",
    "role": "Actor",
    "artworks": [ ]
    }
  ]
}
```

Alternative response when nothing is found
HTTP/1.1 404 Not Found

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

What is claimed is:

1. A method of distributing an electronic programming guide (EPG) to a remote content consumption device through a content distribution network (CDN), the method comprising:
   sending from the content consumption device a request for EPG information;
   at the content consumption device, receiving the requested EPG information comprising an indication of a current version of the EPG;
   sending from the content consumption device a request for channel schedule information, the request comprising the indication of the current version of the EPG;
   at the content consumption device, receiving the requested channel schedule information, the channel schedule information specifying a plurality of channel schedule block versions of a channel's schedule, each channel schedule block covering a common defined length of time; and
   if a received channel schedule block version differs from a schedule block version of an existing channel schedule block available on the content consumption device, requesting and receiving an updated channel schedule block corresponding to the existing channel schedule block.

2. The method of claim 1, wherein the existing channel schedule block is visible in a portion of the EPG currently displayed.

3. The method of claim 1, wherein the existing channel schedule block is located in a portion of the EPG not currently being displayed.

4. The method of claim 1, further comprising:
   determining that the current version of the EPG differs from an available EPG version available on the content consumption device,
   wherein, the channel schedule information is requested when the current EPG version differs from the available EPG version.

5. The method of claim 1, further comprising:
   determining if any of the received channel schedule block versions forming a respective channel's schedule differ from the existing channel schedule block versions forming the channel's schedule available on the content consumption device.

6. The method of claim 1, wherein each channel schedule block comprises one or more program identifiers (ID) specifying a program airing during the channel schedule block, the method further comprising:
   requesting and receiving program details associated with a respective program ID of the one or more program IDs of the channel schedule block.

7. The method of claim 6, wherein requesting program details comprises transmitting a program details request cacheable by the CDN.

8. The method of claim 1, wherein determining if the received channel schedule block version differs from the existing channel schedule block version is performed when:
   a portion of the schedule associated with a channel schedule block is to be displayed in the EPG; or
   a channel schedule block is to be cached.

9. The method of claim 1, wherein requesting the EPG information comprises transmitting a request cacheable by the CDN.

10. The method of claim 1, wherein requesting the channel schedule information comprises transmitting a channel schedule information request cacheable by the CDN.

11. The method of claim 1, wherein requesting the updated channel schedule block comprises transmitting an updated channel schedule block request cacheable by the CDN.

12. The method of claim 1, wherein each of the EPG information request, channel schedule information request and updated channel schedule block request comprise respective HTTP GET messages.

13. A content consumption device comprising:
   a display for displaying programming content;
   a memory for storing instructions; and a processing device for executing the instructions, which when executed configure the content consumption device to perform a method for distributing an electronic programming guide (EPG) through a content distribution network (CDN) by:
  sending from the content consumption device a request for EPG information;
  receiving the requested EPG information comprising an indication of a current version of the EPG;
  sending from the content consumption device a request for channel schedule information, the request comprising the indication of the current version of the EPG;
  receiving the requested channel schedule information, the channel schedule information specifying a plurality of channel schedule block versions of a channel's schedule, each channel schedule block covering a common defined length of time; and
  if a received channel schedule block version differs from a schedule block version of an existing channel schedule block available on the content consumption device, requesting and receiving an updated channel schedule block corresponding to the existing channel schedule block.

14. The content consumption device of claim 13, wherein the existing channel schedule block is visible in a portion of the EPG currently displayed.

15. The content consumption device of claim 13, wherein the existing channel schedule block is located in a portion of the EPG not currently being displayed.

16. The content consumption device of claim 13, wherein the instructions stored in the memory further configure the device to:
  determine that the current version of the EPG differs from an available EPG version available on the content consumption device,
  wherein, the channel schedule information is requested when the current EPG version differs from the available EPG version.

17. The content consumption device of claim 13, wherein the instructions stored in the memory further configure the device to further:
  determine if any of the received channel schedule block versions forming a respective channel's schedule differ from the existing channel schedule block versions forming the channel's schedule available on the content consumption device.

18. The content consumption device of claim 13, wherein each channel schedule block comprises one or more program identifiers (ID) specifying a program airing during the channel schedule block, wherein the instructions stored in the memory further configure the device to further:
  request and receive program details associated with a respective program ID of the one or more program IDs of the channel schedule block.

19. The content consumption device of claim 18, wherein requesting program details comprises transmitting a program details request cacheable by the CDN.

20. The content consumption device of claim 13, wherein it is determined if a received channel schedule block version differs from an existing channel schedule block when:
  a portion of the schedule associated with a channel schedule block is to be displayed in the EPG; or
  a channel schedule block is to be cached.

21. The content consumption device of claim 13, wherein requesting the EPG information comprises transmitting a request cacheable by the CDN.

22. The content consumption device of claim 13, wherein requesting the channel schedule information comprises transmitting a channel schedule information request cacheable by the CDN.

23. The content consumption device of claim 13, wherein requesting the updated channel schedule block comprises transmitting an updated channel schedule block request cacheable by the CDN.

24. The content consumption device of claim 13, wherein each of the EPG information request, channel schedule information request and updated channel schedule block request comprise respective HTTP GET messages.

* * * * *